US006248277B1

(12) United States Patent
Friedrichs

(10) Patent No.: US 6,248,277 B1
(45) Date of Patent: Jun. 19, 2001

(54) CONTINUOUS EXTRUSION PROCESS AND DEVICE FOR RODS MADE OF A PLASTIC RAW MATERIAL AND PROVIDED WITH A SPIRAL INNER CHANNEL

(75) Inventor: Konrad Friedrichs, Weismain (DE)

(73) Assignee: Konrad Friedrichs KG, Kulmbach (DE)

( * ) Notice: Subject to any disclaimer, the term of this patent is extended or adjusted under 35 U.S.C. 154(b) by 0 days.

(21) Appl. No.: 09/284,945

(22) PCT Filed: Oct. 27, 1997

(86) PCT No.: PCT/EP97/05910

§ 371 Date: Jun. 21, 1999

§ 102(e) Date: Jun. 21, 1999

(87) PCT Pub. No.: WO98/18587

PCT Pub. Date: May 7, 1998

(30) Foreign Application Priority Data

Oct. 25, 1996 (DE) ............................................. 196 44 447

(51) Int. Cl.[7] ........................... B29C 47/24; B21C 25/04

(52) U.S. Cl. ................... 264/167; 264/177.1; 264/209.2; 264/209.8; 264/629; 425/79; 425/381; 425/382.3; 425/466; 425/467; 425/468; 72/260; 72/264; 419/67

(58) Field of Search ................................ 264/167, 177.1, 264/209.2, 209.1, 209.8, 629; 425/380, 381, 382.3, 466, 467, 468, 79; 72/260, 264, 253.1; 76/108.1, 108.6; 419/67

(56) References Cited

U.S. PATENT DOCUMENTS 2,174,779 * 10/1939 Delome .
2,422,994 * 6/1947 Taylor .
3,205,692 * 9/1965 Kemppinen et al. .
4,704,055 * 11/1987 Guhring ................................ 408/59
4,779,440 * 10/1988 Cleve et al. ........................... 72/260
4,921,414 * 5/1990 Schliehe et al. .................. 425/131.1
5,049,331 * 9/1991 Hempel ................................ 264/103
5,116,659 * 5/1992 Glatzle et al. ........................ 428/188
5,438,858 * 8/1995 Friedrichs .............................. 72/260
5,780,063 * 7/1998 Friedrichs ......................... 425/131.1

FOREIGN PATENT DOCUMENTS

3600681 * 5/1987 (DE) .
3601385 * 7/1987 (DE) .
0465946 * 6/1991 (EP) .
WO 92/22390 * 12/1992 (WO) .

* cited by examiner

*Primary Examiner*—Jan H. Silbaugh
*Assistant Examiner*—Mark Eashoo
(74) *Attorney, Agent, or Firm*—Oblon, Spivak, McClelland, Maier & Neustadt, P.C.

(57) ABSTRACT

Method and apparatus for the continuous extrusion of rods of plastic raw material. The rods contain at least one inner channel which is at least in part spiral-shaped. The raw material may be a powder-metallurgical or ceramic mass. The material is extruded through a nozzle mouthpiece and made to rotate by an arrangement of flow guiding surfaces. At least one thread made of a flexible or elastic material is entrained and gives the rod a spiral shape with a predetermined pitch. The thread is retained upstream of the nozzle mouthpiece in an eccentric position relative to the rod axis that extends through the nozzle mouthpiece. The movement of rotation of the raw material is adjusted by an outer adjusting force which modifies the angle between the arrangement of flow guiding surfaces and the longitudinal axis of the nozzle mouthpiece to adjust the position and pitch of the spiral channel.

27 Claims, 1 Drawing Sheet

CONTINUOUS EXTRUSION PROCESS AND DEVICE FOR RODS MADE OF A PLASTIC RAW MATERIAL AND PROVIDED WITH A SPIRAL INNER CHANNEL

BACKGROUND OF THE INVENTION

1. Field of the Invention

The invention relates to a process and an apparatus for continuous extrusion of rods of plasticized raw material provided with at least one internal channel which is helical in at least portions.

2. Discussion of the Background

Such a process as well as apparatuses, or in other words extrusion heads, for performing such a process are used, for example, when a rod preform of a plasticized powder compound, such as a powder-metallurgical compound, or in other words a hard-metal or ceramide compound, is to be shaped to a preform, or in other words a sintered-metal or a sintered-ceramic preform, from which a preform in the form of a cylindrical rod for a high-performance tool is then produced in a sintering or baking process. By virtue of the dies or powder mixtures used, these preforms are characterized by extremely high basic strength, especially as regards mechanical stresses and strains as well as abrasion, and so a trend has developed toward using such preforms especially in the manufacture of drilling or milling tools. Since these tools are frequently operated with extremely high cutting speeds, it is important that the lubricant being used be supplied selectively and in many cases under very high pressures to those regions of the cutting edges which are subject to the highest stresses and strains. This is best ensured by co-formed, internal cooling channels, which then emerge on a predetermined pitch circle on the front end of the tool, or in other words preferably on a flank of the ground surface of the tool. Because sintered hard-metal tools can be machined only with costly methods, it is desirable that the shape of the preform approach the final geometry of the tool as closely as possible. This is achieved most simply by using an extrusion process, with which the capability exists of making the preform such that it already has finish-formed internal cooling channels in a continuous process, which has the particular additional advantage that tools of very great length can be made without changing the process operation.

Certainly the process is economical only if it is possible to make the rod such that the geometry and in particular also the position of the at least one internal lubricant or cooling channel are kept within very narrow tolerance limits. This problem becomes more acute if the tool to be made—as is the case for a drilling tool, for example—must be provided with clamping grooves. Because fully hard metal drilling tools are now made with relatively large axial lengths, the at least one internal cooling channel must be co-formed sufficiently exactly that it is disposed at exactly the predetermined position in the drill web in each cross section of the drilling tool, since only then is it ensured that the drill stability will be constant over the entire length and that the exit point of the internal cooling channel will remain unchanged relative to the main cutting edge during finish grinding of the tool.

There are already known numerous attempts to make such tool preforms from plasticized powder compound in the extrusion process in such a way that the requirements of accuracy of position and form of the internal cooling channels are met.

In U.S. Pat. No. 2,422,994 there is already described an extrusion process in which a plasticized powder-metallurgy compound is extruded through an extrusion nozzle. The inside surface of the extrusion nozzle has projections of predetermined cross section and, in the region of the center of the nozzle, there extend axially oriented, rod-like elements fixed to a core, which is disposed upstream from the extrusion nozzle and around which the plasticized compound flows. This process operates in multiple stages, wherein the plasticized raw material is first shaped to a preform with at least one straight, external groove, whereupon the preform obtained in this way is twisted by a relative rotational movement between the extrusion nozzle and the raw material. Such a two-stage forming process is already unfavorable for most raw compounds that have come into use since then, however, because the preform emerging from the extrusion nozzle is extremely pressure-sensitive. Even very small external forces acting on the preform would cause undesired large deformations, especially of the internal co-formed channels, whereby the preform would immediately become unusable.

To overcome this problem, German Patent DE 3601385 describes an extrusion process in which the helical profile of the at least one internal coolant channel is produced simultaneously with the extrusion of the plasticized compound, although in this case the nozzle mouthpiece must be provided internally with a helical profile. At the center of the extrusion nozzle there are provided elastic pins, which at their upstream ends are fixed to a nozzle core and the elasticity of which is chosen to be sufficient that the pins can conform to the swirl flow induced by the internal contour of the nozzle mouthpiece. It has been found that it is difficult to form the cooling-channel helix sufficiently accurately in the preforms with this extrusion head. The projections and depression on the inside surface of the nozzle mouthpiece had to be provided in large numbers in order to induce appropriate rotation of the flow of the compound. As a result, the nozzle mouthpiece is relatively expensive and, moreover, the projections present on the sintered preform must be ground off first of all, leading to material losses.

In European Patent Application EP 465946 A1 there are described a process and an apparatus according to the preamble of claim 1 or of claim 5, with which it is possible to eliminate the process step of cylindrical surface grinding of the finish-sintered cutting-part preforms. For this purpose, the inside surface of the nozzle mouthpiece is formed by the envelope surface of a regular cylinder. A swirl device disposed in the flow of the compound is mounted upstream from the nozzle mouthpiece. Corresponding to one alternative, a swirl motion acting uniformly over the cross section of the strand is imparted to the extrusion compound by means of this swirl device whereas, according to a second alternative, a spinning or revolving movement is imparted to the swirl device by the extrusion compound. To form the at least one internal channel, a filament-like material which conforms to the swirl or rotational motion penetrates into the flow of compound. Thus the pitch-circle diameter on which the cross section of the at least one internal cooling channel is eventually disposed in the extruded preform is influenced by the flow velocity and by the friction losses in the nozzle mouthpiece. According to a further variant of this known process, it is therefore proposed that the nozzle mouthpiece be designed to revolve, thus allowing the rotational motion of the flow of compound to be corrected by the revolving movement.

With this known process, plasticized compounds can be processed in the extrusion process to preforms which are characterized by extremely high accuracy as regards their outside dimensions and the geometry and position of the at least one internal cooling channel. Of course, in this known process and these known apparatuses for performing the process, there exists the need to keep the working accuracy largely independent of the operating parameters of the process, such as the flow conditions in the inlet region of the nozzle mouthpiece, the composition of the plasticized compound and the flow velocities through the nozzle mouthpiece, etc.

SUMMARY OF THE INVENTION

The object of the invention is therefore to further develop a process and an apparatus such that the interfering effects mentioned hereinabove can be suppressed with little complexity, so that the manufacturing accuracy itself is preserved when system-related parameter fluctuations occur.

According to the invention, there is integrated into the nozzle mouthpiece an array of flow-guiding surfaces, whose angle of orientation relative to the longitudinal axis of the nozzle mouthpiece is adjustable by a positioning device, which preferably can be actuated by an external positioning force. Besides the fact that hereby there can be manufactured a multitude of geometries of the extruded preform without complex modifications and with a simplified extrusion head, there is achieved thereby the particular advantage that the rotational motion of the plasticized raw material can be continuously corrected during the extrusion process such that the position and profile of the at least one internal cooling channel can be kept within narrow tolerance limits. In this way fluctuations of the process parameters of the extrusion process can be reliably stabilized or compensated. At the same time, the advantage is retained that the process uses material sparingly, and so subsequent machining of the sintered preform is not required. The preform is extruded with a smooth, regular cylindrical outside surface which—allowing for the percentage shrinkage which will occur—is maintained such that the least possible removal of material is needed during finish-machining of the preform. Because the angle of orientation of the array of flow-guiding surfaces can be corrected at any time during the extrusion process, the helical pitch of the at least one internal channel can be kept within narrow limits which heretofore were unattainable, specifically even if the mass flowrate of the plasticized compound and/or other physical conditions of the extrusion process were to be changed.

In principle there exist two options for disposing the array of flow-guiding surfaces at the extrusion head. According to this further embodiment, the plasticized compound flowing through the nozzle mouthpiece develops autorotation by virtue of the angle of orientation of the guiding surfaces relative to the longitudinal axis of the nozzle mouthpiece and because of the static friction at the inside wall of the nozzle mouthpiece. The rotational velocity depends on the one hand on the flow velocity of the plasticized feed compound and on the other hand on the preselected angle of orientation of the array of flow-guiding surfaces which exists at the time. Hereby velocity fluctuations of the flow of compound can be smoothed out, because the speed of revolution of the array of guiding surfaces or of the nozzle mouthpiece is automatically adapted to the velocity of the flow of compound. The helical pitch of the at least one internal cooling channel in the produced preforms is thus kept constant, specifically regardless of whether the plasticized compound enters the nozzle mouthpiece rapidly or slowly.

By virtue of the natural compensation of the interfering effects caused by existing fluctuations of parameters of the extrusion process, the process according to the invention and the apparatus according to the invention are suitable for processing a broad spectrum of powder-metallurgical, plasticized compounds. It must be emphasized, however, that other mixtures and compositions, even those with extremely different physical characteristics and thus different flow behavior, can be processed by the process according to the invention without having to relinquish the advantages cited hereinabove.

A particularly simple layout of the array of flow-guiding surfaces is achieved. It has been found that the flow of compound, which splits temporarily in the boundary region of the flow while passing around the guide blade, closes back to a complete circular cross section immediately downstream from the guide blade under the effect of the extremely high molding pressures prevailing in the nozzle mouthpiece. Thus the flow of compound is distorted as slightly as possible, whereby the microstructural quality of the preform manufactured by the process according to the invention can be maintained at an extremely high level.

When the nozzle mouthpiece is fixed to the extrusion head such that it revolves therewith, it is advantageous for the array of flow-guiding surfaces to extend over a substantial portion of the overall length of the nozzle mouthpiece.

In contrast, if—corresponding to further variants of the subject matter of the application—the nozzle mouthpiece is held revolvably on the extrusion head, in such a way that the axis of revolution coincides with the central axis of the nozzle mouthpiece, it is preferable for the array of flow-guiding surfaces to be laid out such that it extends only over an axially limited inlet portion of the nozzle mouthpiece. Thereby it is ensured that the revolving motion of the nozzle mouthpiece induced by the array of flow-guiding surfaces is reliably capable of maintaining or stabilizing the autorotation motion over the remaining flow length of the flow of compound in the nozzle mouthpiece of the compound by the effect of the static friction conditions at the inside wall of the nozzle mouthpiece. In this case the array of flow-guiding surfaces is advantageously laid out or adapted to the geometry of the nozzle mouthpiece such that the extruded flow of compound rotates with the same angular velocity as the nozzle mouthpiece when it emerges. In this way adjustment and automatic control of the rotational motion of the flow of compound become even more accurate, with particular advantages when the positioning device for the array of flow-guiding surfaces is integrated into a control loop of the extrusion apparatus.

In principle, it is possible to adjust the angle of orientation of the array of flow-guiding surfaces in stages. It is particularly advantageous, however, when the adjustment is made infinitely variably or in extremely small steps, for example by means of a stepping motor. In this way any desired swirl angle of the internal cooling channel can be generated and controlled.

When the at least one guide blade is braced at least over a substantial distance against the inside surface of the nozzle mouthpiece, preferably via surface contact therewith, relatively large forces can be absorbed. The advantage is then obtained that the radial extent of the guide blade can be increased, with the result that the coupling between flow velocity and speed of revolution of the nozzle mouthpiece and thus the rotational flow becomes more exact.

To suppress interfering vibrations of the extrusion system, it is advantageous for the positioning device for the array of flow-guiding surfaces to have a vibration-damping device. This vibration-damping device is advantageously incorporated in a positioning mechanism, preferably in the form of a damped elastic means. Such a vibration-damping device is advantageous in particular when the positioning device is incorporated in a control system for the geometry of the at least one internal cooling channel.

The process according to the invention works by using easily bendable or highly elastic filaments, which are fixed locally with their upstream end disposed preferably in the inlet region of the nozzle mouthpiece. It is equally possible, however, to perform the process using filaments or internal rods which have higher modulus of elasticity in order to impart greater dimensional stability, in which case these thin rods or pins are held on a support which is mounted to revolve around an axis of revolution coinciding with the axis of the nozzle mouthpiece.

BRIEF DESCRIPTION OF THE DRAWING

A practical example of the invention will be explained in more detail hereinafter with reference to a schematic drawing.

DETAILED DESCRIPTION OF THE PREFERRED EMBODIMENTS

Figure 1:
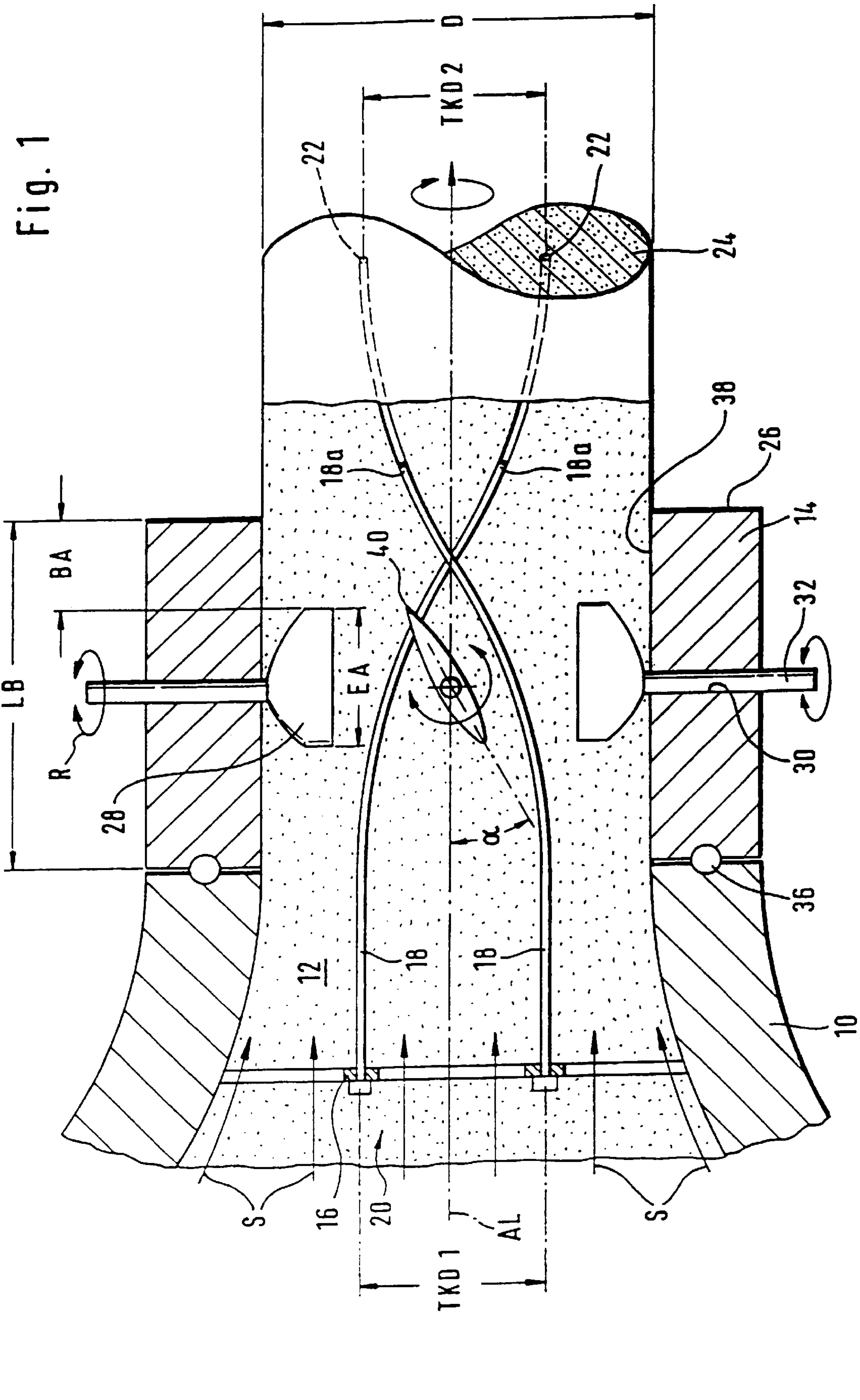
FIG. 1 shows a schematic cross section through the downstream region of an extrusion head for performing the process according to the invention.

In FIG. 1, reference symbol 10 denotes an extrusion head with which there can be performed a process of continuous extrusion of rods of plasticized raw material provided with at least one internal channel which is helical in at least portions. The plasticized raw material can comprise, for example, a powder-metallurgical or ceramic compound, wherein the powder is chosen preferably from the group of ceramic powders, hard-metal powders such as a mixture of tungsten carbide and cobalt, and metal powders, as well as from mixtures of these constituents, such as the cermet mixtures. The FIGURE shows the downstream end of the extrusion head, which tapers conically and forms the inlet portion 12 of a nozzle mouthpiece 14. In inlet portion 12, or in other words in extrusion head 10, there is disposed a retaining device 16, on which there are fixed upstream ends of filaments 18, with which internal cooling channels 22 can be produced in extruded regular cylindrical preform rod 24 during extrusion of the plasticized raw material.

In the practical example shown in the FIGURE, filaments 18 comprise easily bendable or highly elastic material such as plastic, or a chain whose links hang movably on each other. Filaments 18 have a downstream end 18*a*, which extends beyond front end 26 of nozzle mouthpiece 14. Filaments 18 are attached to retaining device 16 on a pitch-circle diameter TKD1, and in fact are preferably adjustable, in order to permit adaptation to each particular nozzle mouthpiece 14, or in other words to outside diameter D of preform rod 24 to be made.

Arrow S denotes the parallel flow of plasticized powder compound entering nozzle mouthpiece 14, which parallel flow—as can be seen in the FIGURE—aligns highly elastic or easily bendable filaments 18 in parallel. In nozzle mouthpiece 14 there is provided an array of flow-guiding surfaces in the form of a plurality of guide blades 28 distributed uniformly over the circumference and mounted adjustably in nozzle mouthpiece 14. For this purpose there are provided substantially radially directed bores 30, through which there extends a positioning spindle 32 of each particular guide blade 28. Arrow R indicates that guide blade 28 in question is adjustable by means of a positioning device, which is not illustrated in more detail, such that the angle of orientation of guide blade 28 relative to longitudinal axis AL of nozzle mouthpiece 14 is adjustable, preferably in infinitely variable manner. The FIGURE shows that the adjustment of guide blades 28 can be effected by an external positioning force, with the result that the angular orientation of the array of flow-guiding surfaces in the form of guide blades 28 can be varied at any time during the extrusion process.

Reference symbol 36 schematically represents a bearing by which the nozzle mouthpiece is fixed to revolve on extrusion head 10, specifically such that the axis of revolution coincides with longitudinal axis AL of nozzle mouthpiece 14, which has a concentric cylindrical internal bore 38. Guide blades 28 are laid out or disposed in nozzle mouthpiece 14 such that their axial extent EA amounts to only a fraction of the total end-to-end length LB of nozzle mouthpiece 14. Furthermore, downstream edge 40 of guide blades 28 is disposed at a minimum distance BA from the outlet end, or in other words from front end 26 of the nozzle mouthpiece, which is sufficiently large to ensure that the flow of plasticized compound split by guide blades 28 is closed back to complete a circular cross section downstream from guide blades 28.

The structure shown in the FIGURE leads to the following functional principle of the extrusion apparatus:

The plasticized compound enters inlet portion 12 of nozzle mouthpiece 14 on the left side in the FIGURE, specifically in such a way that it has the form of a parallel flow on entering nozzle mouthpiece 14. This parallel flow now strikes guide blades 28, which are adjusted to an angle of orientation $\alpha$ and by means of which—due to the hydrodynamic forces—autorotation is imparted to nozzle mouthpiece 14. The speed of revolution of nozzle mouthpiece 14 depends on the flow velocity of the arriving plasticized compound and on angle of orientation $\alpha$.

Because of the static friction condition which the flow passing through nozzle mouthpiece 14 has at inside surface 38 of the nozzle mouthpiece, rotational motion around axis AL is also imparted to the plasticized compound, while length LB ultimately determines with which rotational velocity the plasticized compound will exit nozzle mouthpiece 14, or in other words with which rotational velocity around axis AL rod preform 24 will emerge from nozzle mouthpiece 14. By suitable provisions, such as air-cushioned bearing of emerging rod preform 24, it is possible reliably to prevent pressure-sensitive rod preform 24 from being impermissibly deformed as it emerges in rotating condition.

Because of the rotation of the plasticized compound and of emerging rod preform 24, easily bendable or highly elastic filaments 18 are also aligned with the flow of plasticized compound, or in other words they are shaped, by the flow of plasticized compound as it passes through, into helical form, the pitch of which can be adjusted as desired by angle of orientation a. Expressed otherwise, by means of the action of the external positioning device on guide blades 28, the profile of internal cooling channels 22 as well as the position of cooling channels 22, or in other words pitch-circle diameter TKD2 in finish-extruded preform rod 24, can be exactly defined.

Positioning spindles 32 of guide blades 28 are preferably components of a central positioning mechanism, which has the form, for example, of a planetary gear, so that angle of orientation $\alpha$ of the guide blades can be varied synchronously and uniformly. To prevent vibrations from developing in the extrusion apparatus or in the positioning system, a suitable vibration-damping means can be provided. This vibration-damping means is formed, for example, by elastic components with self-damping behavior.

At the outlet of the extrusion head, or in other words in the region of emerging rod preform 24, there is advantageously provided a device for measuring and monitoring the geometry of the at least one internal cooling channel 22 or for determining the position and size of pitch-circle diameter TKD2. This measuring and sensing device is a component of a control loop, in which the corresponding measured signal is fed back to the positioning device for guide blades 28, so that the desired position and geometry of the at least one internal cooling channel 22 can be automatically controlled regardless of the interfering effects which occur, such as the flow velocity and the physical properties of the plasticized compound. From the foregoing description it follows that the extrusion system according to the invention already smooths out any fluctuations of velocity of the flow of compound which may occur because they are inherent to the system, by the fact that the speed of revolution of nozzle 14, which is in autorotation condition, is continuously and automatically adapted to the velocity of the flow of compound. The helical pitch of the internal cooling channels produced in rod preforms 24 during the extrusion process is thereby always of constant size regardless of the flow-through velocity, whereby substantially narrower tolerances of position and geometry of the internal cooling channels can be achieved.

By means of the external positioning device according to the invention, it is further possible, with one and the same nozzle mouthpiece 14, to make rods in which the internal cooling channels have different pitches. In the extreme case, the array of flow-guiding surfaces in the form of guide blades 28 can be adjusted such that guide blades 28 have an angle of orientation α of 0°, so that a preform rod 24 with straight internal channels can be made.

The concept according to the invention is equally applicable for the case that the nozzle mouthpiece is fixed to extrusion head 10 such that it revolves therewith. In this case guide blades 28, which are adjustable by the positioning device, ensure alone that the desired swirl or rotational motion, with magnitude determined by adjustable angle of orientation α, is imparted to the plasticized compound entering mouthpiece 14 as a parallel flow. In this case also the positioning device for the array of flow-guiding surfaces can be integrated into a control system in which the positioning device is driven as a function of the measured signals.

Guide blades 28 are illustrated only schematically in the FIGURE. Guide blades 28 are braced against inside surface 38 of the nozzle mouthpiece, preferably such that they maintain surface contact therewith, in which case frictional locking can additionally be provided. A further advantage can be achieved by shaping guide blades 28 such that the guide surfaces continuously rest snugly on inside wall 38 of nozzle mouthpiece 14 during adjustment of angle of orientation α. This is possible, for example, when the guide blades are constructed from members which press resiliently against the inside surface.

Embodiments differing from the practical examples described hereinabove are obviously possible without departing from the basic idea of the invention. For example, it is possible to operate the process according to the invention using pins which have limited elasticity and which are fixed instead of filaments 18 to a retaining device mounted to revolve around the central axis of the nozzle mouthpiece in the extrusion head. The pins, or in other words the at least one pin can be pre-twisted into helical form already corresponding largely to that helical form which the at least one internal cooling channel is supposed to have after extrusion of the extruded preform. It is possible to provide, for the retainer of this core pin comprising material of high modulus of elasticity, a separate drive, by means of which fine adjustment of the helical profile is possible by incorporation into a suitable control loop.

It is also possible to vary the number, size and arrangement of guide blades 28. For example, the array of flow-guiding surfaces can be provided with a plurality of arrays of guide blades axially staggered along the nozzle mouthpiece. It also is not absolutely necessary to dispose guide blades 28 with uniform circumferential spacing. For vibration-related reasons it may be practical to provide an irregular arrangement over the circumference. Furthermore, as a modification of the illustrated practical example, provisions can be made to correct the rotational motion of extruded preform rod 24 by means of a further drive device. This additional drive can be provided either on nozzle mouthpiece 14 itself or downstream from this component.

The invention therefore provides a process and an apparatus for continuous extrusion of rods of plasticized raw material, such as a powder-metallurgical or ceramic compound, provided with at least one internal channel which is helical in at least portions. The plasticized raw material is pressed out of a nozzle mouthpiece, an array of flow-guiding surfaces provided therein participating in imparting thereto a rotational motion, which entrains at least one filament of easily bendable or elastic material, said filament being retained upstream from the nozzle mouthpiece at a point off the rod axis and extending through the nozzle mouthpiece, and shapes it to helical form with predetermined pitch. To increase the manufacturing accuracy and manufacturing tolerances of the extruded preform rod with simultaneous simplification of the associated apparatus, the invention provides that, for adjustment of the position and/or the pitch of the at least one helical internal channel, the rotational motion of the plasticized raw material is adjusted by an external positioning force, which varies the angular orientation of the array of flow-guiding surfaces relative to the longitudinal axis of the nozzle mouthpiece.

What is claimed:

1. A process for continuous extrusion of rods of plasticized raw material provided with at least one internal channel which is helical in at least one portion, in which the plasticized raw material is pressed out of a nozzle mouthpiece, an array of flow guiding surfaces provided in the nozzle mouthpiece and participating in imparting thereto a rotational motion, which entrains at least one filament of easily bendable or elastic material, said filament being retained upstream from the nozzle mouthpiece at a point off an axis of the rod and extending through the nozzle mouthpiece, and shapes the at least one internal channel to helical form with predetermined pitch, characterized in that, for adjustment of a position and/or a pitch of the at least one helical internal channel, the rotational motion of the plasticized raw material is adjusted by an external positioning force, which varies an angular inclination of the flow-guiding surfaces relative to a longitudinal axis of the nozzle mouthpiece.

2. A process according to claim 1, characterized in that the array of guiding surfaces together with a guiding-surface support, revolves in the same direction as the plasticized raw material.

3. A process according to claim 1, characterized in that the array of guiding surfaces is retained locally.

4. A process according to claim 1, characterized in that the plasticized raw material is a plasticized powder compound, wherein the powder is selected from a group consisting of ceramic powders, hard-metal powders including a mixture of tungsten carbide and cobalt, and mixtures of these constituents including cermet mixtures.

5. A process according to claim 1, characterized in that the rotational motion of the plasticized raw material is adjusted by infinitely variable adjustment of the array of flow-guiding surfaces.

6. A process according to claim 1, characterized in that the rotational motion of the plasticized raw material is influenced by a drive device provided at the nozzle mouthpiece.

7. A method for extruding a rod of plasticized raw material, said method comprising the steps of:

injecting a flow of plasticized raw material into a nozzle mouthpiece;

entraining at least one filament in the flow of plasticized raw material to form at least one internal channel within the rod, the at least one filament being retained upstream of the nozzle mouthpiece at a location offset from a longitudinal axis of the nozzle mouthpiece and extending through the nozzle mouthpiece; and imparting a rotational motion to the flow of plasticized raw material using an array of flow guiding surfaces provided in the nozzle mouthpiece to form the at least one internal channel having at least one portion that is helical in shape, wherein the rotational motion of the flow of plasticized raw material is adjustable such that the at least one portion is formed in a helical shape having a selected pitch by varying an angular inclination of the flow guiding surfaces.

8. An apparatus for continuous extrusion of rods of plasticized raw material provided with at least one internal channel which is helical in at least one portion, said apparatus comprising a nozzle mouthpiece in which there is provided an array of flow guiding surfaces and through which there extends at least one filament of easily bendable or elastic material, said at least one filament being retained upstream from the nozzle mouthpiece at a point off an axis of the rod, characterized in that an angle of inclination of the flow-guiding surfaces relative to a longitudinal axis of the nozzle mouthpiece can be varied by means of a positioning device.

9. An apparatus according to claim 8, characterized in that the nozzle mouthpiece is held on an extrusion head such that the nozzle mouthpiece revolves therewith.

10. An apparatus according to claim 9, characterized in that the array of flow-guiding surfaces extends over a substantial portion of the overall length of the nozzle mouthpiece.

11. An apparatus according to claim 8, characterized in that the nozzle mouthpiece driven by a drive device.

12. An apparatus according to claim 8, characterized in that the nozzle mouthpiece is held revolvably on an extrusion head, in such a way that the axis of revolution coincides with the central axis of the nozzle mouthpiece.

13. An apparatus according to claim 12, characterized in that the array of flow-guiding surfaces extends over an axially limited inlet portion of the nozzle mouthpiece.

14. An apparatus according to claim 12, characterized in that the array of flow-guiding surfaces is laid out or adapted to the geometry of the nozzle mouthpiece such that the extruded flow of compound rotates with the same angular velocity as the nozzle mouthpiece when the extruded flow emerges from the nozzle mouthpiece.

15. An apparatus according to claims 8, characterized in that the angle of orientation of the array of flow-guiding surfaces is infinitely variable at least in portions.

16. An apparatus according to claim 8, characterized in that the nozzle mouthpiece has a smooth regular cylindrical inside surface and the array of flow-guiding surfaces ends at a distance upstream from the outlet end of the nozzle mouthpiece that the extruded rod has a smooth surface.

17. An apparatus according to claim 8, characterized in that the at least one filament extends beyond a front end of the nozzle mouthpiece.

18. An apparatus according to claim 8, characterized in that, in order to impart greater dimensional stability, the at least one filament has a high modulus of elasticity and is held on a support which is mounted to revolve around an axis of revolution coinciding with the axis of the nozzle mouthpiece.

19. An apparatus for continuous extrusion of rods of plasticized raw material provided with at least one internal channel which is helical in at least one portion, said apparatus comprising a nozzle mouthpiece in which there is provided an array of flow guiding surfaces and through which there extends at least one filament of easily bendable or elastic material, said at least one filament being retained upstream from the nozzle mouthpiece at a point off an axis of the rod, characterized in that an angle of inclination of the array of flow-guiding surfaces relative to a longitudinal axis of the nozzle mouthpiece can be varied by means of a positioning device, characterized in that the array of flow-guiding surfaces is provided with at least one guide blade, which is fixed adjustably to the nozzle mouthpiece.

20. An apparatus according to claim 19, characterized in that the at least one guide blade is braced at least over a substantial length against the inside surface of the nozzle mouthpiece, preferably such that it maintains surface contact therewith.

21. An apparatus according to claim 19, characterized in that there is provided, distributed over a circumference, a plurality of guide blades, which preferably are synchronously adjustable by means of the positioning device.

22. An apparatus according to claim 21, characterized in that the positioning device is provided with a positioning mechanism, which has the form of a planetary gear.

23. An apparatus according to claim 19, characterized in that the positioning device is provided with a vibration-damping means for the array of flow-guiding surfaces.

24. An apparatus according to claim 23, characterized in that the positioning device is incorporated in a control system controlling for the geometry and/or position of the at least one internal channel.

25. An apparatus according to claim 19, characterized in that the array of flow-guiding surfaces is provided with a plurality of arrays of guide blades axially staggered along the nozzle mouthpiece.

26. An apparatus for extruding a rod of plasticized raw material, said apparatus comprising:

a nozzle mouthpiece configured to receive a flow of plasticized raw material;

at least one filament retained upstream of said nozzle mouthpiece at a location offset from a longitudinal axis of said nozzle mouthpiece and extending through said nozzle mouthpiece, said at least one filament being configured to be entrained in the flow of plasticized raw material to form at least one internal channel within the rod;

an array of flow guiding surfaces provided in said nozzle mouthpiece configured to impart a rotational motion to the flow of plasticized raw material, said flow guiding surfaces having adjustable angular inclinations.

27. An apparatus for extruding a rod of plasticized raw material, said apparatus comprising:

a nozzle mouthpiece configured to receive a flow of plasticized raw material;

at least one filament retained upstream of said nozzle mouthpiece at a location offset from a longitudinal axis of said nozzle mouthpiece and extending through said nozzle mouthpiece, said at least one filament being configured to be entrained in the flow of plasticized raw material to form at least one internal channel within the rod; and means for imparting a rotational motion, having at least one flow guiding surface, to the flow of plasticized raw material that is configured to form the at least one internal channel having at least one portion that is helical in shape, wherein the means for imparting a rotational motion is provided in the nozzle mouthpiece and includes a means for adjusting the rotational motion of the flow of plasticized raw material such that the at least one portion is formed in a helical shape having a selected pitch.

* * * * *